UNITED STATES PATENT OFFICE.

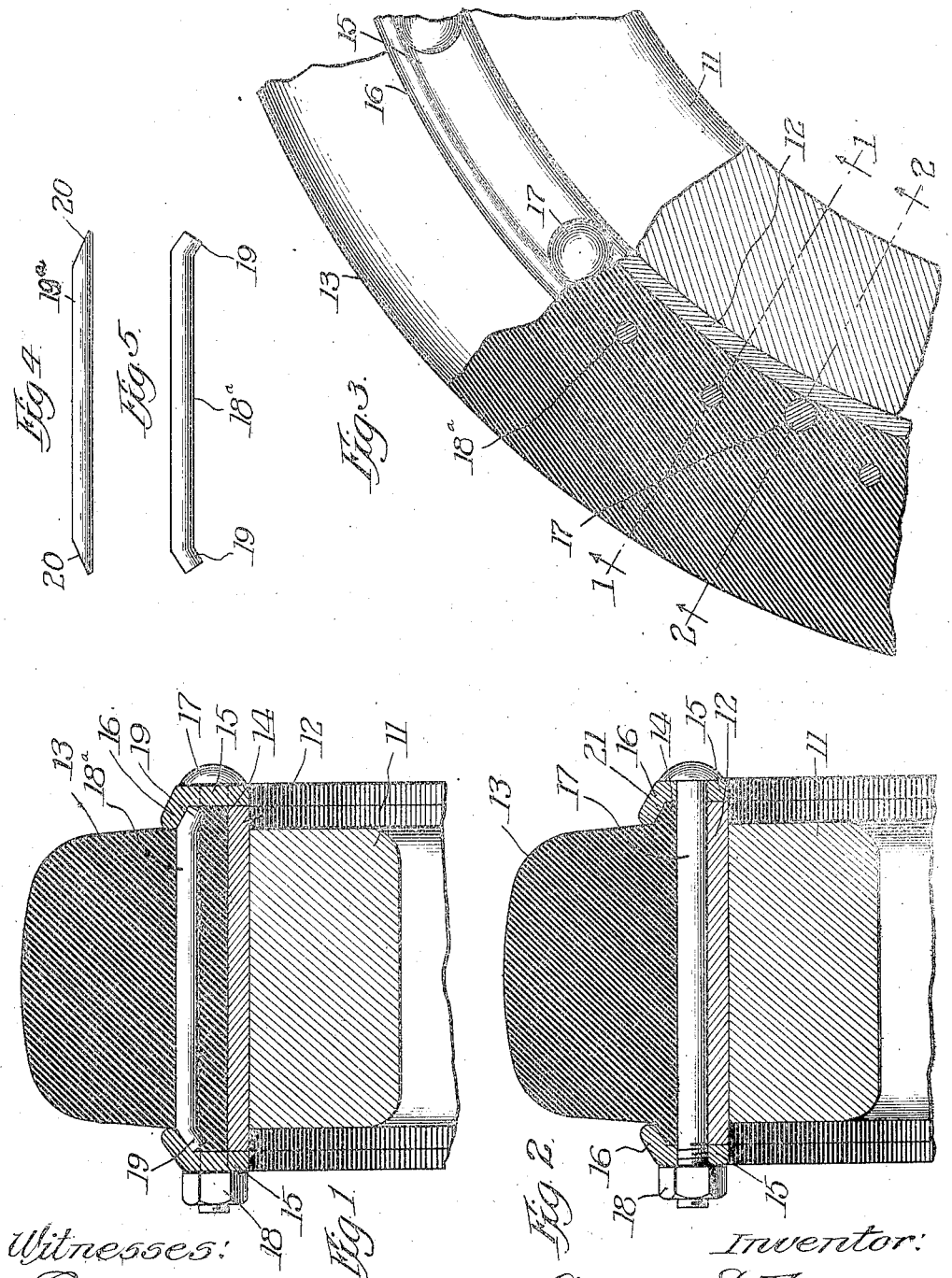

CHARLES S. TURNER, OF AKRON, OHIO, ASSIGNOR TO THE FIRESTONE TIRE & RUBBER COMPANY, OF AKRON, OHIO, A CORPORATION OF OHIO.

VEHICLE-TIRE.

1,057,467.   Specification of Letters Patent.   Patented Apr. 1, 1913.

Application filed February 6, 1911. Serial No. 606,983.

*To all whom it may concern:*

Be it known that I, CHARLES S. TURNER, a citizen of the United States, residing at Akron, in the county of Summit and State of Ohio, have invented certain new and useful Improvements in Vehicle-Tires, of which the following is a specification.

My invention relates to vehicle tires and refers particularly to means for attaching a tire to a vehicle wheel rim.

It is one of the objects of my invention to provide a construction in which the tire will be drawn more closely into contact with the vehicle rim as the retaining rings which engage the sides of the rim are moved laterally toward each other by means of suitable fastening bolts. I have found that if no stiffening means are employed in connection with the tire that the desired result is not obtained to nearly as satisfactory an extent as when cross rods are used passing transversely through the tire. These cross rods are either bent inwardly toward the center of the wheel on their ends or beveled surfaces are formed thereon, so that when the corresponding beveled surfaces of the retaining rings are brought home against the ends of the cross rods, the tire is caused to snugly engage the rim and is held firmly in position with no danger of displacement as a result of some unusual strain. These and other advantages of my invention will be more readily understood by reference to the accompanying drawings which represent a preferred embodiment of my improvements, and in which:

Figure 1 is a section through a tire, the felly of the wheel and the retaining and fastening devices, this section being taken on the line 1—1 of Fig. 3. Fig. 2 is a transverse section taken on the line 2—2 of Fig. 3 and showing one of the fastening bolts. Fig. 3 is a side elevation and partly vertical section through a portion of the wheel, tire and the associated parts. Fig. 4 is a side elevation of one of the cross rods used in the tire. Fig. 5 is a side elevation of a modified form of cross rod.

The felly 11 has the band 12 preferably of metal and made according to the usual construction. Engaging the band 12 is the tire 13 having the lateral extensions 14 on the portion of the tire which engages the band 12. The retaining rings 15 engage the sides of the band 12 and on their outer portions have the beveled flanges 16, which are slightly smaller in diameter than the corresponding surfaces of engagement of the tire. These rings are held in position by means of the fastening bolts 17 and the nuts 18, the bolts 17, as clearly shown in Figs. 2 and 3, passing through suitable apertures in the tire 13.

Passing through the tire 13 is a plurality of cross rods 18$^a$ having the inwardly bent ends 19 which are engaged by the beveled portions 16 of the retaining rings 15. Instead of bending the ends of the cross rods, as shown in Figs. 1 and 5, these cross rods may be made straight, as in Fig. 4 where the rods 19$^a$ are shown with the beveled surfaces 20.

It will now be clear that when the various parts are assembled the tire 13 will be securely held in position by engagement of the beveled portions 16 of the retaining rings 15 with the beveled ends 19, of the cross rods 18$^a$. As the nuts 18 are tightened, the tire will be gradually brought into tighter engagement with the rim 12, and, moreover, disengagement of the tire from the rim is effectually prevented by the stiffening action of these cross rods. Between the cross rods 18$^a$ the flanged portions 16 of the retaining rings directly engage the beveled surfaces 21 of the portions 14 of the tire 13.

It will be clear that by means of my construction the tire 13 may readily be removed from the rim 12. This is accomplished by removing the nuts 18, then removing one of the retaining rings 15, thus enabling the tire to be easily slipped off from the rim.

It will be apparent to those skilled in the art that many changes could be made in the detailed construction of the parts which I have described without departing from the spirit and scope of my invention.

What I claim:

The combination of a vehicle wheel, a resilient tire mounted thereon having flanges at its opposite edges beveled on their upper surfaces, and fastening means for securing said tire to the wheel comprising members at opposite sides of the wheel forming a space therebetween for the reception of the base of the tire, and having inwardly projecting flanges, the inner surfaces of which are inclined for engagement with the beveled surfaces of the tire flanges, strengthening rods passing transversely through the base portion of the tire, the opposite ends of which extend outwardly so that the upper surfaces thereof directly engage the inclined surfaces of the side members of the wheel, said strengthening rods having their opposite protruding ends bent inwardly to occupy a diverging relation with reference to each other and to present upper surfaces of said protruding ends inclining in keeping with the inclination of the side members, the under inclined surfaces of said ends engaging the base portion of the resilient tire, and means for drawing the side members toward each other to cause the ends of the transverse rods to engage beneath the flanges thereof and to secure the base portion of the tire between the rods and the peripheral portion of the wheel.

CHARLES S. TURNER.

Witnesses:
S. G. CARRCHUFF,
S. P. HESBRUCK.